(12) United States Patent
Wassermann et al.

(10) Patent No.: US 12,326,160 B2
(45) Date of Patent: Jun. 10, 2025

(54) LOCKING UNIT

(71) Applicant: SVM Schultz Verwaltungs-GmbH & Co. KG, Memmingen (DE)

(72) Inventors: Ralph Wassermann, Holzgünz (DE); Florian Hölzle, Illertissen (DE); Matthias Wetzler, Erkheim (DE)

(*) Notice: Subject to any disclaimer, the term of this patent is extended or adjusted under 35 U.S.C. 154(b) by 0 days.

(21) Appl. No.: 18/063,526

(22) Filed: Dec. 8, 2022

(65) Prior Publication Data

US 2023/0184271 A1 Jun. 15, 2023

(30) Foreign Application Priority Data

Dec. 9, 2021 (DE) .......................... 102021132545.5

(51) Int. Cl.
| | | |
|---|---|---|
| F15B 15/26 | (2006.01) | |
| H01F 7/08 | (2006.01) | |
| H01F 7/16 | (2006.01) | |
| F16H 63/34 | (2006.01) | |

(52) U.S. Cl.
CPC ............ F15B 15/26 (2013.01); H01F 7/081 (2013.01); H01F 7/1607 (2013.01); F16H 63/3483 (2013.01); *H01F 2007/086* (2013.01)

(58) Field of Classification Search
CPC .. F16H 63/3483; F16H 63/3491; H01F 7/081; H01F 7/1607; F15B 15/26
See application file for complete search history.

(56) References Cited

FOREIGN PATENT DOCUMENTS

| | | | |
|---|---|---|---|
| DE | 102011014574 A1 | 12/2011 | |
| DE | 102012223736 A1 | 6/2014 | |
| DE | 102020103335 A1 | 8/2021 | |
| DE | 102021200980 A1 * | 8/2022 | |
| EP | 3734122 A1 | 11/2020 | |
| EP | 3879136 A1 * | 9/2021 | ............ B60T 13/662 |

OTHER PUBLICATIONS

Foreign Communication for German Patent Application No. 102021132545.5, German Search Report, 6 pages.
Office Action for EP 22207 520.2 issued Jan. 4, 2024; 8 pgs.

* cited by examiner

*Primary Examiner* — Kenneth Bomberg
*Assistant Examiner* — Daniel S Collins
(74) *Attorney, Agent, or Firm* — Scheef & Stone, L.L.P.; Keith C. Rawlins

(57) ABSTRACT

A locking unit with a hydraulically actuable piston, an electromagnet with a coil and an armature, at least one latching element, a coupling rod, and a magnetic element. The coupling rod connects the magnetic element to the armature or an armature rod which is attached thereto, and a prestressing element fixes the magnetic element in a guide tube radially. As a result, an advantageous position determination is made possible by way of sensing of a magnetic field which is generated by the magnetic element.

17 Claims, 7 Drawing Sheets

LOCKING UNIT

CROSS-REFERENCE TO RELATED APPLICATIONS

This non-provisional application claims the benefit of, and priority to, German Application No. 10 2021 132 545.5, entitled Locking Unit, filed on Dec. 9, 2021, which is incorporated by reference in its entirety.

FIELD OF THE DISCLOSURE

The present disclosure generally relates to a locking unit, in particular for the parking lock of an automatic transmission.

BACKGROUND

Automatic transmissions can have a locking unit which is capable of holding a motor vehicle in which the automatic transmission is installed. This locking unit is included in motor vehicles in addition to a parking brake. Locking units of this type can have, for example, a hydraulically actuable piston, the locking units typically being configured in such a way that the piston can be held reliably in a defined position for a relatively long time. During driving, the piston should not suddenly activate its locking function, and also during a parked time, the locking action should not be lost.

It is increasingly desired that locking units should be configured in such a way that a locking action can be monitored at all times. This should take place as reliably as possible.

SUMMARY

A locking unit includes: a hydraulically actuable piston; an electromagnet including a coil and an armature; a coupling rod fastened to the armature or to an armature rod; a magnetic element attached to the coupling rod in an opposed manner with respect to the armature or with respect to the armature rod; a guide tube configured to guide the magnetic element; at least one prestressing element configured to act on the coupling rod and to hold the magnetic element in the guide tube radially without play; and at least one latching element configured to interact with the armature or the armature rod which is attached thereto. The hydraulically actuable piston or a sleeve which is connected to the hydraulically actuable piston has at least one latching receptacle, wherein the hydraulically actuable piston can be fixed by a securing interaction of the latching element with the latching receptacle.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
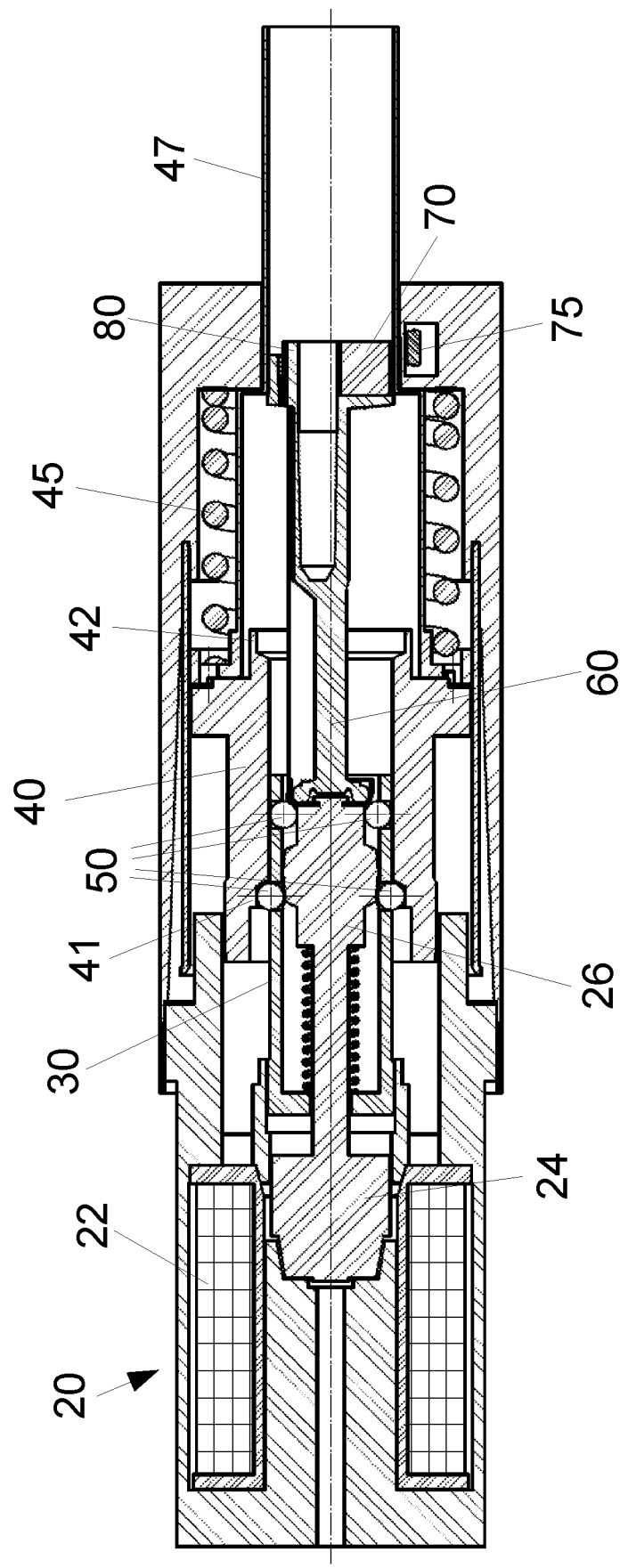
FIG. 1 illustrates a cross-sectional view of a locking unit.

Disclosed is a locking unit for which locking action can be reliably monitored. In aspects, the locking unit is for a parking lock of an automatic transmission. The locking unit has a hydraulically actuable piston, an electromagnet with a coil and an armature, at least one latching element configured to interact with the armature or an armature rod which is attached to it, The piston or a sleeve which is connected to the piston has at least one latching receptacle, with the result that the piston can be fixed by way of the holding interaction of the latching element with the latching receptacle.

The locking unit has a coupling rod which is fastened to the armature or to the armature rod. A magnetic element is attached to the coupling rod in a manner which is opposed with respect to the armature or the armature rod. The coupling rod therefore serves, in particular, for connection of the magnetic element to the armature or the armature rod. The locking unit has a guide tube, in which the magnetic element is guided. Furthermore, at least one prestressing element is provided which acts on the coupling rod and holds the magnetic element in the guide tube radially without play. In particular, a spacing from a sensor is also minimized as a result.

A locking unit of this type allows a magnetic element to be provided in an advantageous way, by means of which magnetic element the position of the armature or the armature rod can be sensed. First of all, the coupling rod achieves a spacing from an actuator coil of the electromagnet, with the result that no influencing of the sensor signal by way of electromagnetic stray fields arises. The guidance of the magnetic element in the guide tube means that the magnetic element can move in a defined way, with the result that the measurement also takes place in a defined way. The prestressing element ensures that the magnetic element is held in the guide tube radially without play, with the result that not only an axial position, but rather also a radial position is set in a defined way. An undefined position offset of the magnetic element in the guide tube transversely with respect to the longitudinal direction of the guide tube and an associated distortion of the measurement are avoided in this way. A position offset of this type in the transverse direction can be caused, for example, by way of an oscillating profile which is customary in automotive applications (inertial forces). This effect is also eliminated by the prestressing element.

The hydraulically actuable piston can be configured, in particular, as a hollow piston. It can engage, in particular, into a parking lock of an automatic transmission or can actuate a parking lock of this type; it typically has two end positions, one end position corresponding to a non-locked state and a further end position corresponding to a locked state.

The electromagnet can be configured, in particular, in such a way that the coil surrounds the armature. A magnetic field which is generated by the coil can typically actuate the armature one-dimensionally in two directions.

The latching element can be pressed outward, for example, in the case of a certain position of the armature or armature rod, with the result that it engages into a latching receptacle of the piston. A further movement of the piston is prevented as a result. In particular, the piston can therefore be fixed in one of its two end positions. The piston can be movable, in particular, one-dimensionally.

The magnetic element can be configured, in particular, as a permanent magnet. It can also fundamentally be configured as an electromagnet, however. It typically generates a magnetic field which is detected by a detector or another element which detects a magnetic field, it being possible here for generated signals to typically be evaluated electronically, in order to extrapolate a state of the armature and/or the armature rod.

The locking unit can have, in particular, an anti-rotation safeguard of the coupling rod. The anti-rotation safeguard can bring it about, in particular, that a rotation of the coupling rod and/or of the magnetic element and/or of the prestressing element relative to the sensor, detector, to the armature or to the armature rod or relative to a sleeve or another element is avoided. A rotation of this type is, in particular, a rotation about a longitudinal axis of the coupling rod and/or a rotation about an axis along which the armature, armature rod and/or coupling rod move. In particular, the rotation about the magnetic axis (between the north pole and the south pole) of the magnetic element should be prevented, because this would distort the measurement. This is the case, in particular, if a magnetic element is used which is not rotationally symmetrical in cross section, but rather is, for example, circular segment-shaped and, in particular, faces the detector, as a result of which costs can be saved. As a result, it can be avoided that the coupling rod rotates undesirably; a rotation of this type might distort the measurement.

The anti-rotation safeguard can be configured, in particular, by means of at least one projection on the coupling rod, which at least one projection engages into a groove of a sleeve or of another element, for example of the armature or of the armature rod. The anti-rotation safeguard can also be configured by means of at least one projection on a sleeve or on another element, for example the armature or the armature rod, which at least one projection engages into a groove of the coupling rod. Embodiments of this type have proven advantageous. Other embodiments are also possible, however.

It is to be noted that the embodiment described above with an anti-rotation safeguard and the specific embodiments of an anti-rotation safeguard can also be realized independently of the use of a magnetic element, a guide tube and/or a prestressing element.

The prestressing element can be configured, in particular, integrally and/or in one piece with the coupling rod. This permits a simple embodiment. A separate attachment of the prestressing element is also possible, however.

The prestressing element can be configured, for example, in the form of an elastic bracket or in the form of two or more elastic brackets. This permits a simple embodiment, it typically being possible for elastic brackets of this type to be configured in such a way that, on account of their elasticity, they fundamentally press radially to the outside and therefore against the guide tube.

Each bracket typically has a free end. In particular, free ends of two brackets can be arranged directly adjacently with respect to one another. This permits a realization of a shape which is uniform to the outside, for example circular or at least substantially circular, with merely one interruption between the two free ends of the brackets, with the result that the desired effect of the brackets can be produced over a comparatively large circumferential region.

The bracket or the brackets can be, in particular, of at least approximately circular segment-shaped configuration. This permits an adaptation to a guide tube. Here, the guide tube can have, in particular, a circular internal cross section. Other embodiments are also possible, however. Stated more generally, in particular, the brackets or the prestressing element can be of complementary or at least substantially complementary configuration with respect to an internal cross section of the guide tube against which they bear.

The prestressing element can also be configured as a cap with a plurality of projecting elastic fingers. This permits simple assembly of the prestressing element and an effect which is at least approximately uniform radially.

The prestressing element can also be configured as a compression spring. This can be supported, in particular, against an inner wall of the guide tube.

The magnetic element can be, in particular, of disk segment-shaped configuration. This permits simple insertion into a typical geometry. Other geometries are also possible, however.

The magnetic element can be arranged on the coupling rod, in particular, in an opposed manner with respect to the prestressing element. This can mean, for example, that the magnetic element is situated on one side with regard to a center point and the prestressing element is situated on the other side with regard to the center point.

The guide tube can be configured, in particular, as a constituent part of the piston. As a result, the guide tube can be integrated simply. In particular, the guide tube can be configured in an opposed manner with respect to the electromagnet. A separate configuration of the guide tube is also possible, however.

The locking element can have, in particular, a sensor for sensing a magnetic field which is generated by the magnetic element. As a result, a direct evaluation of a position of the magnetic element and therefore also a position or an axial location of the armature and/or the armature rod can be determined.

FIG. 1 shows a locking unit 10. The locking unit 10 has an electromagnet 20. The electromagnet 20 has an electric coil 22 which is arranged radially outside an armature 24. The armature 24 can be moved by means of the coil 22, by the coil 22 being loaded with current in a targeted manner and, as a result, generating a magnetic field.

An armature rod 26 is attached to the armature 24. Said armature rod 26 protrudes into a sleeve 30, in which the armature rod 26 can move.

A piston 40 which, inter alia, is guided axially movably by way of the sleeve 30 is situated radially outside the sleeve 30. The piston 40 can therefore move horizontally in the illustration of FIG. 1; it is prevented from carrying out further movements.

The sleeve 30 fixes a plurality of latching elements 50 which in the present case are of spherical configuration. The latching elements 50 can be pressed radially outward by means of the armature rod 26 which is shaped correspondingly on the outer side, and then engage into a first latching receptacle 41 or into a second latching receptacle 42 of the piston 40. As a result, the piston 40 can be fixed in the two axial end positions, by the latching elements 50 being pressed toward the outside by way of the armature rod 26 when the piston 40 is situated in a corresponding axial position.

The piston 40 is hydraulically actuable in a way which is not shown in greater detail. In addition, a piston spring 45 is provided which prestresses the piston 40 to the left.

A coupling rod 60 is attached to the armature rod 26, which coupling rod 60 moves axially with the armature rod 26 and therefore also with the armature 24. At its longitudinal end which is opposed with respect to the armature rod 26, the coupling rod 60 protrudes into a guide tube 47 which is configured as a constituent part of the piston 40. A magnetic element 70 and a prestressing element 80 are attached to the coupling rod 60 at the right-hand longitudinal end. The magnetic element 70 generates a magnetic field, since it is configured as a permanent magnet. A sensor 75 for sensing the generated magnetic field is situated radially outside this, with the result that a position of the magnetic element 70 and therefore also of the armature 24 can be determined based on a sensed magnetic field. The prestressing element 80 is supported against the upper part of the guide tube 47 and fixes the magnetic element 70 radially toward the bottom. As a result, a radial play of the magnetic element 70 is avoided, as a result of which it is also avoided that the magnetic element 70 assumes different spacings from the inner circumference of the guide tube 47 during operation and, as a consequence thereof, the spacing from the sensor is changed, which spacing is ultimately the relevant spacing. As a result, the above-described magnetic detection can be improved considerably.

Figure 2:
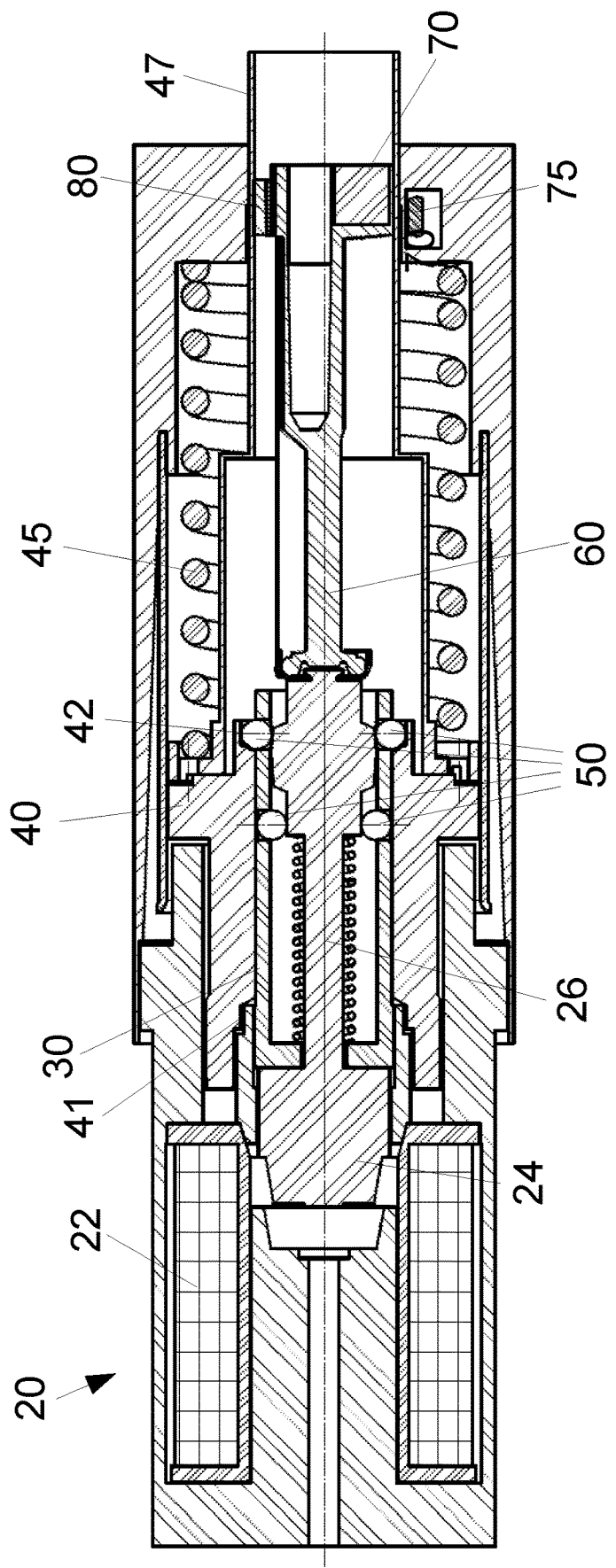
FIG. 2 illustrates the cross-sectional view of the locking unit in another state.

FIG. 2 shows the locking unit 10 in another state. While, in the state which is shown in FIG. 1, the piston 40 is in a position in which it is shifted to the right, the piston 40 is shifted to the left in the state which is shown in FIG. 2 and is latched in this position by way of other latching elements 50. Accordingly, the piston spring 45 is longer overall and/or relieved. In comparison to the state of FIG. 1, the magnetic element 70 is situated further to the right, since the armature 24 and the armature rod 26 are also situated further to the right. This state can be detected by way of the sensor 75, since the magnetic field which is situated at the location of the sensor 75 changes considerably between these two states.

Figure 3:
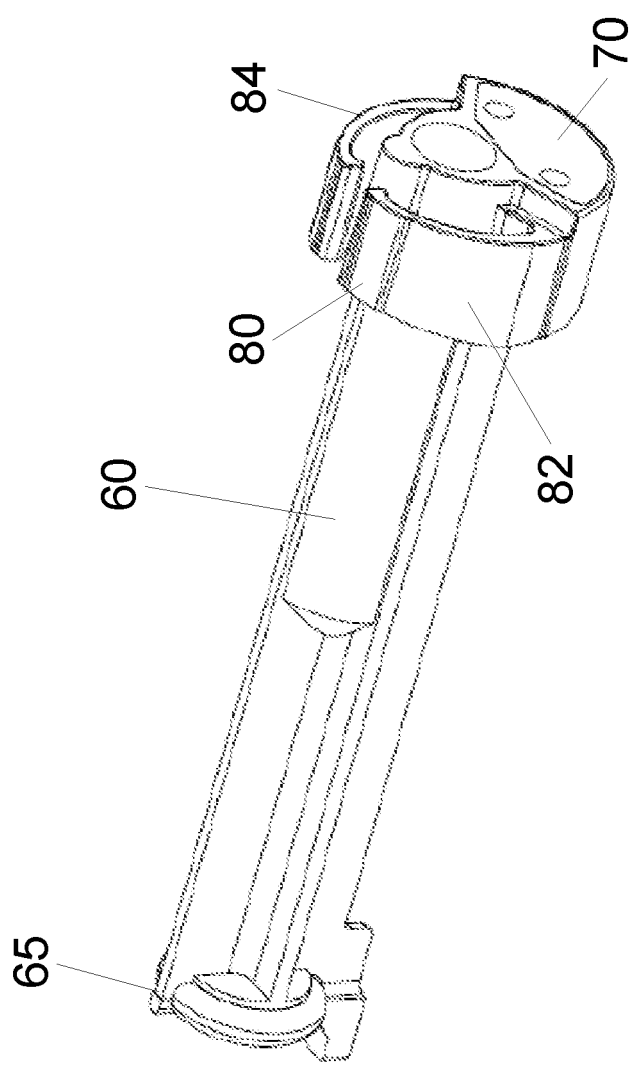
FIG. 3 illustrates a perspective view of a part of the locking unit.

FIG. 3 shows the coupling rod 60 with the magnetic element 70 which is attached to it, and the attached prestressing element 80. As is shown, the prestressing element 80 is configured in the form of two brackets 82, 84 which are elastic and take up approximately a quarter circle. Their free ends point toward one another and allow only a slight gap in between. The two elastic brackets 82, 84 are attached to the coupling rod 60 in an opposed manner with respect to the free ends. This permits a simple configuration and possibly also an exchange of the brackets 82, 84. As shown, the magnetic element 70 is of circular segment-shaped configuration; it takes up substantially a part of the lower half of the coupling rod 60.

The coupling rod 60 has a projection 65 at the left-hand end. As will be described in greater detail further below, said projection 65 forms a part of an anti-rotation safeguard.

Figure 4:
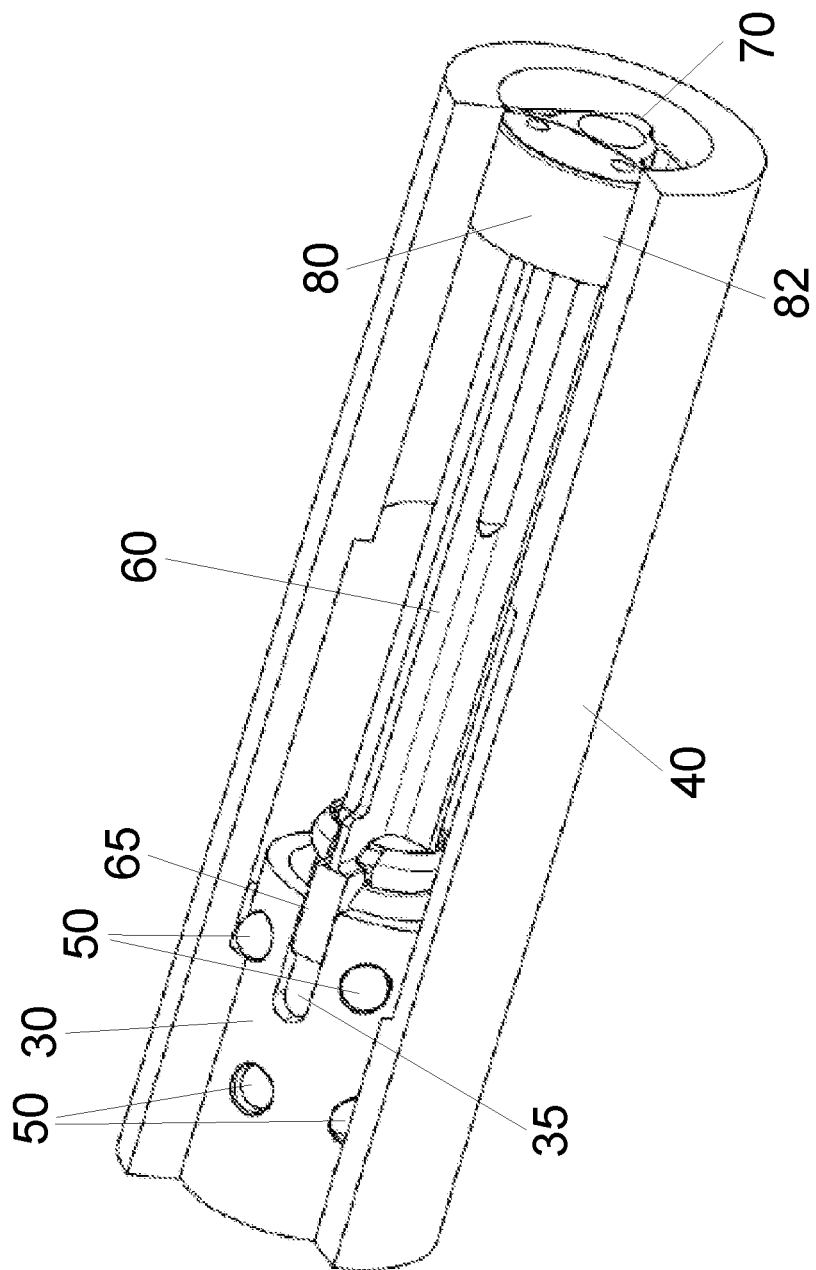
FIG. 4 illustrates a perspective view of other parts of the locking unit.

This is shown in greater detail in FIG. 4. Here, not only the components which can be seen in FIG. 3 are shown, but rather additionally also the sleeve 30 and a part of the piston 40. A groove 35 which, as shown, receives the projection 65 of the coupling rod 60 is configured in the sleeve 30. This permits securing of the coupling rod 60 against rotation, with the result that not only radial fixing of the magnetic element 70 takes place overall, but rather also a rotation about a longitudinal axis of the coupling rod 60 is prevented effectively. Since the sleeve 30 does not move together with other components, the anti-rotation safeguard is effected in a highly reliable way.

Figure 5:
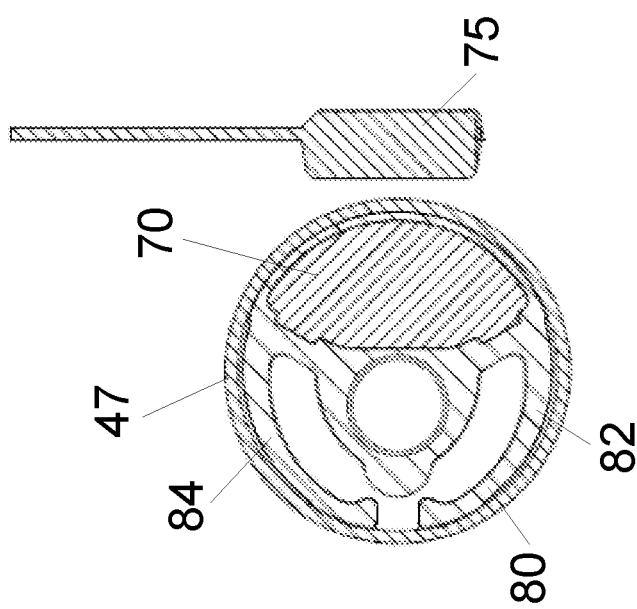
FIG. 5 illustrates another cross-sectional view of the locking unit.

FIG. 5 shows a cross section through the locking unit 10 at a location at which the magnetic element 70 is situated. Here, the configuration of the prestressing unit 80 in the form of two brackets 82, 84 can be seen clearly. They are supported internally in the guide tube 47 and therefore ensure that the magnetic element 70 is prestressed toward the sensor 75. As a result, a defined position relationship is achieved within the guide tube 47.

Figure 6:
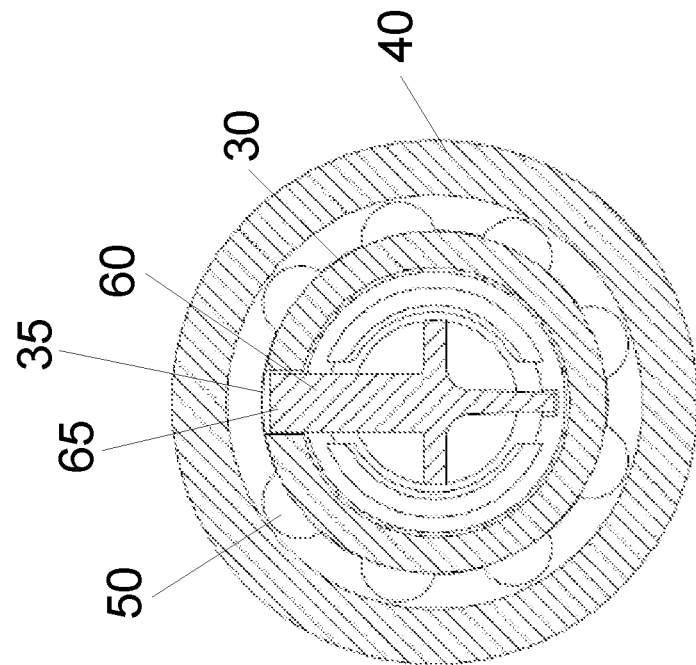
FIG. 6 illustrates another cross-sectional view of the locking unit.

FIG. 6 shows a section through a part of the locking unit 10; it can be seen here how the projection 65 engages into the groove 35 of the sleeve 30. As a result, it is prevented effectively that the coupling rod 60 rotates relative to the sleeve 30. The latching elements 50 and the piston 40 which lies further to the outside can be seen somewhat further to the outside.

Figure 7:
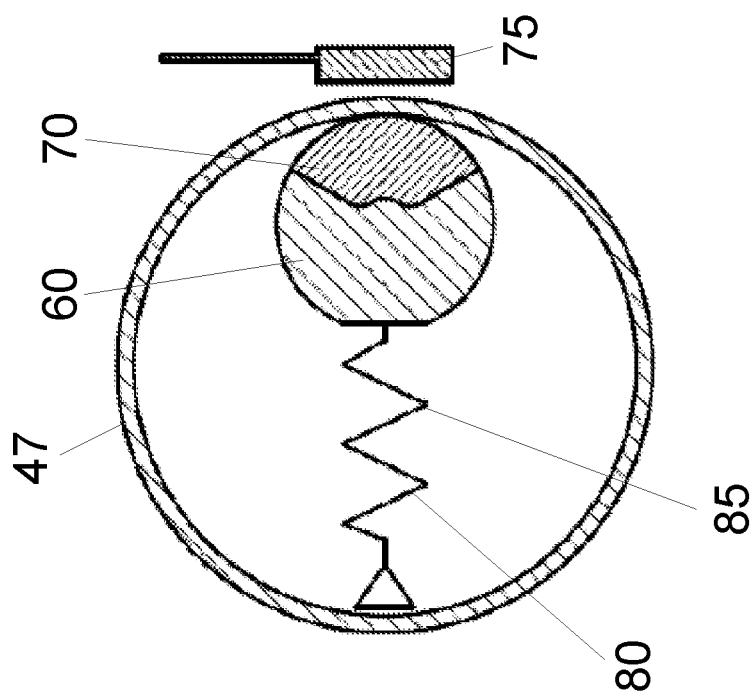
FIG. 7 illustrates a part of the locking unit in accordance with another embodiment.

FIG. 7 shows a part of a locking unit 10 in accordance with a second exemplary embodiment. Here, in contrast to the first exemplary embodiment, the locking unit 80 is not configured in the form of brackets, but rather in the form of a compression spring. This compression spring is fastened to the coupling rod 60 on the right-hand side in the illustration of FIG. 7, and is supported on the left-hand side against an inner wall of the guide tube 47. The magnetic element 70 is also loaded radially toward the sensor 75 as a result.

Figure 8:
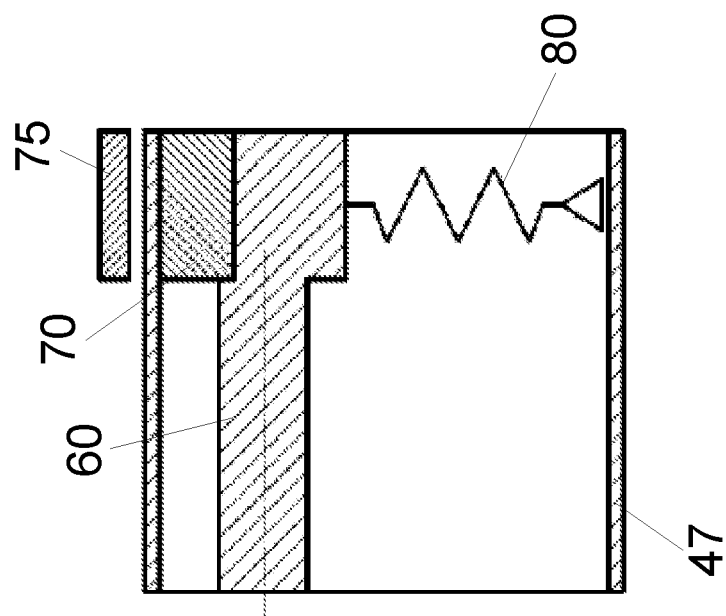
FIG. 8 illustrates the part of the locking unit from FIG. 7 in another view.

FIG. 8 shows a longitudinal section along a longitudinal direction; it can also be seen that the prestressing element 80 which is configured as a spring is supported on an inner surface of the guide tube 47 and accordingly prestresses the magnetic element 70 radially without play.

Figure 9:
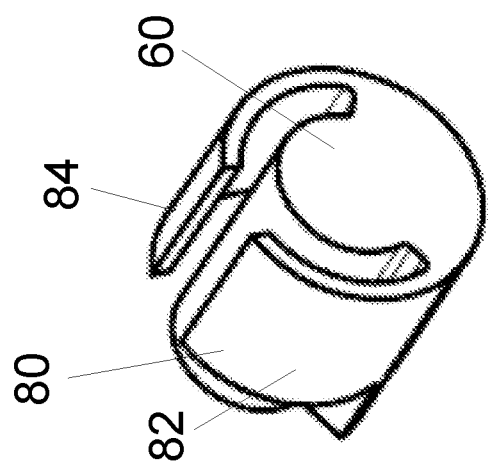
FIG. 9 illustrates a part of a locking unit in accordance with another embodiment.

FIG. 9 shows a part of a locking unit 10 in accordance with a third exemplary embodiment. Here, in contrast to the first exemplary embodiment, the two elastic brackets 82, 84 are configured integrally with the rest of the coupling rod 60. This permits particularly simple production with a virtually identical functionality.

Figure 10:
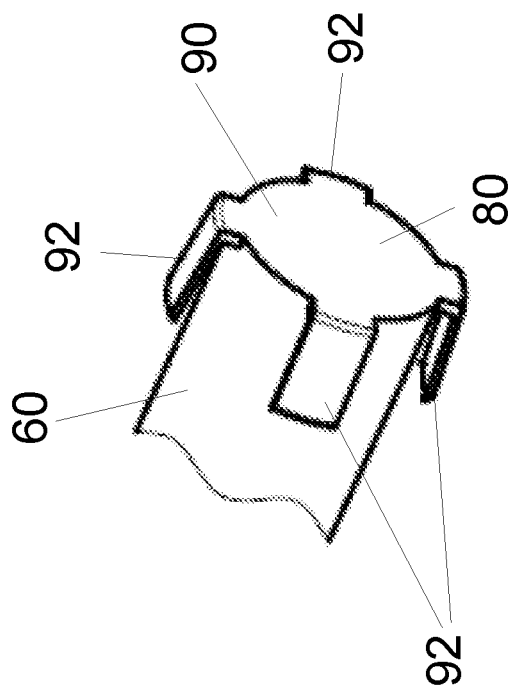
FIG. 10 illustrates a part of a locking unit in accordance with another embodiment.

FIG. 10 shows a part of a locking unit 10 in accordance with a fourth exemplary embodiment. Here, the prestressing element 80 is configured in the form of a cap 90 which is pushed over the coupling rod 60 and which has four projecting elastic fingers 92. These elastic fingers 92 press radially against an inner wall of the guide tube 47, with the result that radially play-free guidance is also achieved as a result.

LIST OF DESIGNATIONS

10 Locking unit
20 Electromagnet
22 Coil
24 Armature
26 Armature rod
30 Sleeve
35 Groove
40 Piston
41 Latching receptacle
42 Latching receptacle
45 Piston spring
47 Guide tube
50 Latching elements
60 Coupling rod
65 Projection
70 Magnetic element 75 Sensor
80 Prestressing element
82 Bracket
84 Bracket
85 Compression spring
90 Cap
92 Elastic fingers Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A locking unit comprising:
   a hydraulically actuable piston;
   an electromagnet comprising a coil and an armature;
   a coupling rod fastened to the armature or to an armature rod;
   a magnetic element attached to the coupling rod in an opposed manner with respect to the armature or with respect to the armature rod;
   a guide tube configured to guide the magnetic element;
   at least one prestressing element directly contacting the coupling rod and the guide tube such that the coupling rod holds the magnetic element in the guide tube radially without play; and
   at least one latching element configured to interact with the armature or the armature rod which is attached thereto,
   wherein the hydraulically actuable piston or a sleeve which is connected to the hydraulically actuable piston has at least one latching receptacle, wherein the hydraulically actuable piston can be fixed by a securing interaction of the at least one latching element with the at least one latching receptacle.

2. The locking unit of claim 1, wherein the coupling rod has an anti-rotation safeguard.

3. The locking unit of claim 2, wherein the anti-rotation safeguard comprises at least one projection on the coupling rod, wherein the sleeve have a groove, wherein the at least one projection engages into the groove of the sleeve.

4. The locking unit of claim 2, wherein the anti-rotation safeguard comprises at least one projection on the sleeve, wherein the coupling rod has a groove, wherein the at least one projection engages into the groove of the coupling rod.

5. The locking unit of claim 1, wherein the at least one prestressing element is configured integrally with the coupling rod.

6. The locking unit of claim 1, wherein the at least one prestressing element comprises one or more elastic bracket.

7. The locking unit of claim 6, wherein each of the one or more elastic bracket has a free end.

8. The locking unit of claim 7, wherein the one or more elastic bracket comprises at least two elastic brackets, wherein free ends of the at least two elastic brackets are arranged directly adjacently with respect to one another.

9. The locking unit of claim 6, wherein the one or more elastic bracket has a circular segment-shape.

10. The locking unit of claim 1, wherein the at least one prestressing element comprises a cap, wherein the cap has a plurality of projecting elastic fingers.

11. The locking unit of claim 1, wherein the at least one prestressing element is a compression spring.

12. The locking unit of claim 1, wherein the magnetic element has a disk segment-shape.

13. The locking unit of claim 1, wherein the magnetic element is arranged on the coupling rod in an opposed manner with respect to the at least one prestressing element.

14. The locking unit of claim 1, wherein the guide tube is part of the hydraulically actuable piston.

15. The locking unit of claim 1, further comprising a sensor for sensing a magnetic field which is generated by the magnetic element.

16. The locking unit of claim 1, wherein the at least one prestressing element is configured integrally with the coupling rod.

17. The locking unit of claim 1, wherein the at least one prestressing element is configured in one piece with the coupling rod.

* * * * *